July 28, 1936.  H. V. LUDWICK  2,049,268
SAFETY ATTACHMENT FOR TRUCK WHEELS
Filed Nov. 22, 1934
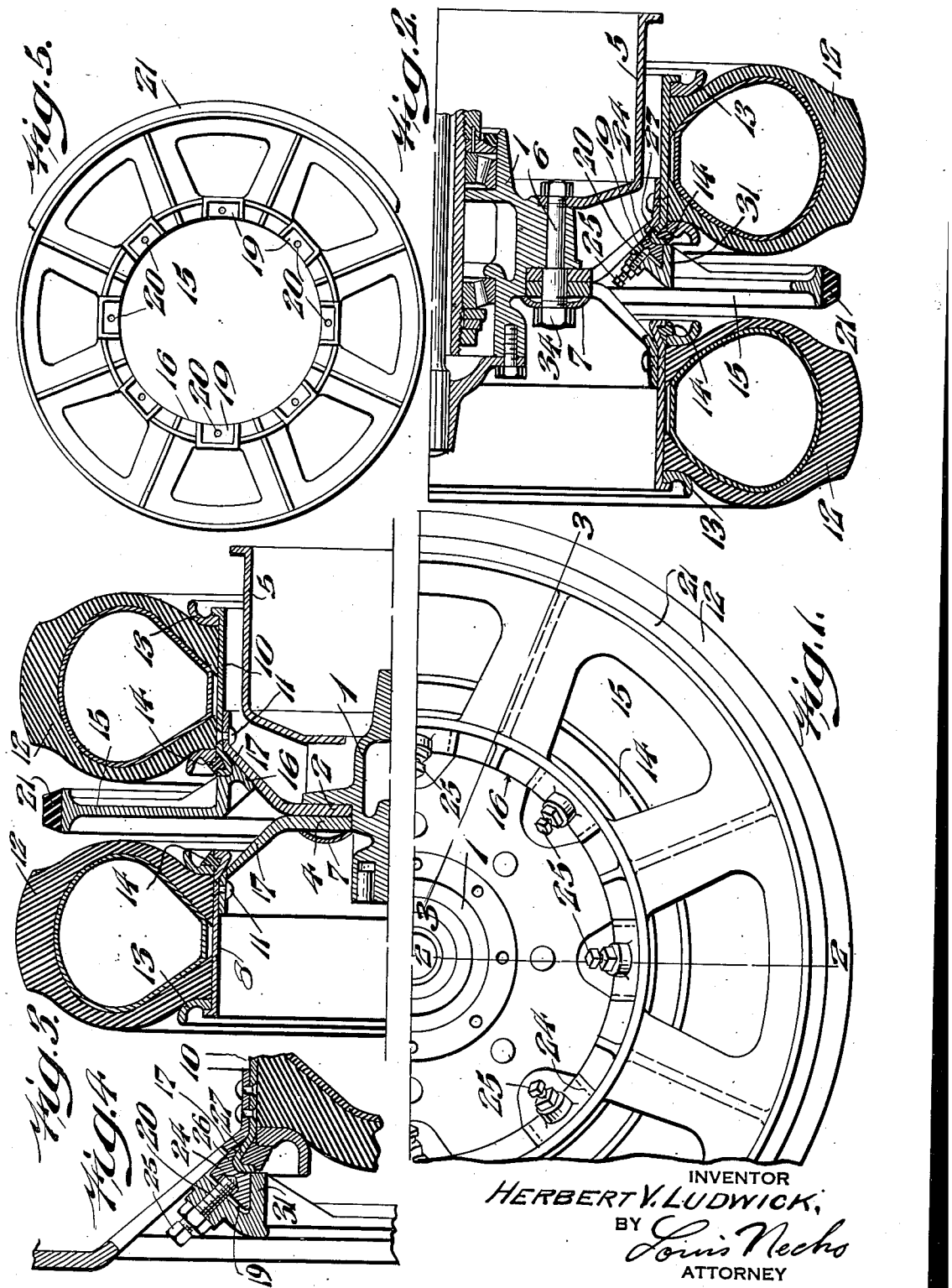
INVENTOR
HERBERT V. LUDWICK,
BY
ATTORNEY Patented July 28, 1936

2,049,268

UNITED STATES PATENT OFFICE 2,049,268

SAFETY ATTACHMENT FOR TRUCK WHEELS

Herbert V. Ludwick, Dearborn, Mich.

Application November 22, 1934, Serial No. 754,209

4 Claims. (Cl. 301—39)

My invention relates to a new and useful safety attachment of the general type disclosed in my co-pending applications Nos. 716,589 and 716,590, the present construction having more particular reference to a safety attachment especially adapted for use in connection with wheels on heavy duty trucks and trailers whereby an auxiliary cushioned support is provided for taking up the load in the event of a sudden or gradual deflation of one or both of the pneumatic tires carried by the wheels.

My invention further relates to a safety attachment of the type mentioned, which is inexpensive to manufacture, easy to assemble, and which can be applied to wheel constructions now on the market without materially interfering with their present construction and assembly.

The construction, manner of operation, and assembly will be more clearly set forth in the following specification in connection with the accompanying drawing in which:

Fig. 1 represents a fragmentary view in side elevation of the dual wheel assembly with one of the wheels removed to show the internal construction.

Fig. 2 represents a section on line 2—2 of Fig. 1, both wheels being in operative position.

Fig. 3 represents a section on line 3—3 of Fig. 1, both wheels being in operative position.

Fig. 4 represents a fragmentary sectional view, on an enlarged scale, showing details of construction.

Fig. 5 represents a side elevation of the safety attachment shown detached.

Referring to the drawing in which like reference characters indicate like parts, I designates the hub of a dual wheel assembly, to which are secured the disc or spoke wheels 2 and 4 and the brake drum 5 by means of the bolts 6, with or without the use of the spring washer 7. The wheels 2 and 4 carry the rims 8 and 10 which are suitably secured thereto by the bolts or rivets 11. The rims 8 and 10 carry the pneumatic tires 12 which are secured thereon by the side rings 13 and the locking rings 14 in the usual manner. The safety attachment 15, shown detached in Fig. 5, is inserted between the wheels 2 and 4 and is provided with the inclined inner annular flange 16 which may seat upon or engage the inclined portions 17 of either of the wheels 2 and 4, as shown in Fig. 3. The safety attachment 15 is provided with the pockets 19 which have the threaded apertures 20 and preferably carries the outer cushion tread 21. In order to secure the safety attachment in place, I position the wedge-shaped members 24 in the pockets 19 and then tighten the bolts 25 passing through the apertures 20, thus pressing the wedge-shaped members 24 radially outwardly with respect to the hub of the wheel. The wedge-shaped members, as will be best seen in Fig. 4, are provided, on their inboard sides, with the tongues 26 which are adapted to be wedged between the deflected portion 27 of the contiguous rim (the rim 10 in this case) and the slanted portion 17 of the corresponding wheel. On their outboard sides wedge-shaped members 24 are adapted to bear upon or engage the correspondingly inclined walls 31 of the pockets 19, so that when the bolts 25 are tightened and the wedges 24 are pressed radially outwardly, the safety attachment 15 will be pressed firmly against the adjacent bearing surface and thus rigidly secured to the contiguous wheel. In assembling this construction the inboard wheel is first piloted on the studs or bolts 6 whereupon the safety attachment 15 is then placed in position and the bolts 25 are tightened, and finally the outboard wheel is piloted on the studs 6 and clamped tight in position by the nuts 34 with or without the spring washer 7.

While I have shown and described my invention as applied to a dual truck wheel assembly, it is to be understood that my novel attachment can be equally well applied to single wheels or tandem wheels without departing from the scope of the invention.

It will thus be seen that I have devised a novel safety attachment which is adapted to take the load in the event of deflation of the corresponding tire and that my novel safety attachment is easily and practicably applied to present day constructions without interfering with their conventional assembly. Furthermore, my novel attachment is of the lightest possible construction consistent with the necessary rigidity and also serves to agitate a current of air calculated to cool the wheel assembly. I also wish to direct attention to the simplicity and effectivness of the locking means by which my safety attachment is secured in position, and to the ease with which it may be applied to or detached from a wheel.

I claim:

1. A safety attachment for dual wheels comprising a disk member adapted to be positioned between the dual wheels and having substantially V shaped recesses formed therein and facing one of said dual wheels, a plurality of wedges positioned in said pockets and bolts threaded through apertures in the walls of said pockets and adapted to bear against said wedges to press the latter against the rim of the adjacent wheel rigidly but detachably to secure said attachment to said wheel.

2. A safety attachment for dual wheels each having a pneumatic tire supporting rim comprising an annular member adapted to be positioned between said wheels and having a plurality of pockets formed therein facing one of said wheels, a plurality of wedges positioned in said pockets and adapted to bear against the pneumatic tire-supporting rim of said wheel, and means for urging said wedges against said rim whereby said safety attachment is detachably but rigidly clamped to said wheel.

3. A safety attachment for dual wheels, each having a pneumatic tire supporting rim, comprising an annular member adapted to be positioned between said wheels and having a plurality of pockets having inclined walls formed therein facing one of said wheels, a plurality of angularly formed wedges positioned in said pockets and adapted to bear against the pneumatic tire-supporting rim of said wheel, and means for urging said wedges against said rim whereby said safety attachment is detachably but rigidly clamped to said wheel.

4. A safety attachment for dual wheels, each having a pneumatic tire supporting rim, comprising an annular member adapted to be positioned between said wheels and having a plurality of pockets formed therein facing one of said wheels, a plurality of wedges positioned in said pockets and adapted to bear against said wheel and means for urging said wedges against said wheel whereby said safety attachment is detachably but rigidly clamped to said wheel.

HERBERT V. LUDWICK.